United States Patent [19]

Golser

[11] 4,240,045
[45] Dec. 16, 1980

[54] GAS LASER HAVING A CYLINDRICAL DISCHARGE TUBE

[75] Inventor: Hans Golser, Munich, Fed. Rep. of Germany

[73] Assignee: Siemens Aktiengesellschaft, Berlin & Munich, Fed. Rep. of Germany

[21] Appl. No.: 916,118

[22] Filed: Jun. 16, 1978

[30] Foreign Application Priority Data

Jun. 20, 1977 [DE] Fed. Rep. of Germany ............... 77192393[U]

[51] Int. Cl.³ ............................................. H01S 3/03
[52] U.S. Cl. .............................................. 331/94.5 D
[58] Field of Search ................. 331/94.5 D, 94.5 G, 331/94.5 T

[56] References Cited

U.S. PATENT DOCUMENTS

| 3,988,698 | 10/1976 | Crane et al. | 331/94.5 D |
| 4,081,762 | 3/1978 | Golser et al. | 331/94.5 G |

FOREIGN PATENT DOCUMENTS

| 2506707 | 7/1976 | Fed. Rep. of Germany | 331/94.5 G |
| 2506842 | 8/1976 | Fed. Rep. of Germany | 331/94.5 G |

OTHER PUBLICATIONS

D. L. Wright et al., "Laser Becomes a Component for Mass-Market Applications", *Electronics*, Jun. 13, 1974, pp. 91-95.

H. Golser et al., "Helium-Neon Laser Tube LGR 7621 of Coaxial Glass Technology", *Component Reports*, vol. XI, No. 1, Mar. 1976, pp. 1-4.

*Primary Examiner*—James W. Davie
*Attorney, Agent, or Firm*—Hill, Van Santen, Steadman, Chiara & Simpson

[57] ABSTRACT

A gas laser having a cylindrical discharge tube, which consists of a glass casing or envelope sealed at each end by a metallic end cap, each of said end caps having a metal tubular component soldered therein to support a reflector or mirror to form an optical resonator, a capillary, which is secured in the casing adjacent one end cap, whose tubular component acts as an anode, to extend in the glass casing coaxially and is supported in the casing by at least one spring element at an axially displaced position, and a cold cathode, which surrounds at least a portion of the free end of the capillary and is in electrical communication with the other end cap, characterized by the improvement that the glass casing has a length of at least 40 cm so that the output of the laser is at least 10 mW.

1 Claim, 1 Drawing Figure

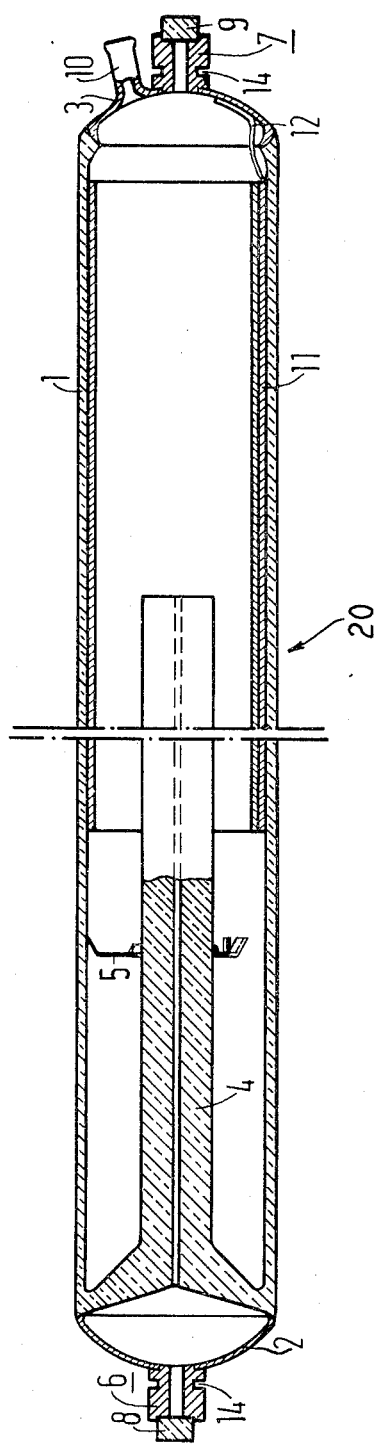

GAS LASER HAVING A CYLINDRICAL DISCHARGE TUBE

BACKGROUND OF THE INVENTION

1. Field of the Invention

The present invention is directed to a gas laser having a cylindrical discharge envelope or tube, which consists of a glass casing, which is sealed at each of its two ends by metal end caps with a capillary being permanently secured adjacent one end cap and extending in the interior of the casing coaxially with at least one spring element supporting the free end of the capillary in the casing, a cold cathode surrounding at least the free end of the capillary and a portion thereof and connected to the other end cap, each of the end caps supporting tubular components which have weakened wall portions so that optical reflectors or mirrors secured on each of the tubular metal component to form an optical resonator can be easily adjusted.

2. Prior Art

Gas lasers of coaxial construction having an inner capillary have been known since approximately 1974. For example, a laser of this type was disclosed in an article by David L. Wright and Dale Crane, *Electronics*, June 13, 1974, pages 91–95. Another example is disclosed in U.S. Pat. No. 3,988,698 and a third example is disclosed in an article by Hans Golser, Helmut Kindl and Peter Maly, "Helium-Neon Laser Tube LGR 7621 of Coaxial Glass Technology", *Components Report*, Vol. XI, No. 1, March 1976, pages 1–4, which was published by Siemens Aktiengesellschaft. These gas lasers, which have the coaxial construction, have proven extremely successful on the market due to their rotational-symmetrical bodies which are completely smooth on the exterior and can be produced substantially automatically. Helium-neon lasers of this construction were previously, however, restricted to an output power of only a few mW and an increase of power could be achieved by only increasing the structural length of the laser tube. As a result of the development of heat during operation and when the plasma tube exceeds a critical length, the plasma tube is deflected or sags to such an extent that in a construction in which the capillary is inaccessible and cannot be subsequently corrected, the power must drop. Tube lengths of approximately 40 cm were previously assumed to exceed the critical value and in the casing a helium neon laser this length was synonymous with an output of approximately 7 mW.

In order to reach higher output powers, the general practice was to employ laser versions with external reflectors and thus designs from the earlier stages of the gas laser development, which had a considerably more complicated structure, for example, dust protection for the reflectors, Brewster windows, etc. It was previously attempted to retain the advantages of the inner capillary in the case of gas lasers having an increased output power of approximately 8 mW for a helium neon laser. Commercially available designs, for example, laser types LT-10 with a 10 mW output power and LT-15 with a 15 mW output power which were manufactured by CW Radiations Company, have however abandoned the cylindrical symmetry. For example, the cathode was located in an appendix vessel and the inner capillary consists of individual sections, which were each embraced by a glass support plate extending from the glass casing. It is obvious that this type of structure will also involve high production costs.

Thus, there was still lacking a cheap gas laser having a relatively high output power. Since there is a considerable continuously increasing requirement for "cheap lasers" having cylindrical symmetry, for example, for use as components in non-mechanical printers, this situation is particularly unsatisfactory.

SUMMARY OF THE INVENTION

The present invention is directed to providing a He-Ne gas laser with an output power of at least 8 mW, which can be produced economically and nevertheless has good characteristic data.

To accomplish these tasks, the present invention is directed to an improvement in a gas laser having a cylindrical discharge tube, which consists of a glass casing being sealed at both ends by metal end caps, each of the metal end caps supporting a tubular metal component which is soldered or secured thereon, each component supporting a reflector or mirror of an optical resonator and having a weakened wall portion in the longitudinal section to enable adjustment of the reflectors of the resonator, said casing having a capillary extending coaxially within the glass casing with one end of the capillary being permanently connected to the glass casing adjacent one metal end cap and being supported in the glass casing by at least one spring element in an axial position from the permanent attachment, and a cold cathode being disposed in the casing adjacent the other end of the cap and surrounding a portion of the capillary tube adjacent the free end thereof, said cold cathode being connected to said other end cap and the metal component of the one cap being the anode. The improvement of the gas laser comprises the glass casing having a length of at least 40 cm. With the length of the casing of at least 40 cm, an output power of at least 10 mW is produced. With greater lengths for the casings such as 50 cm or even 60 cm, higher output powers of at least 15 mW are produced. Preferably, the glass casing has an outer diameter of at least 35 mm and the capillary has a wall thickness of at least 3 mm.

Against previous beliefs and expectations, it has proved that the output power of the coaxial design, which has an inner capillary, can in fact be increased considerably beyond the previously assumed maximum value by increasing the length of the casing beyond the previously assumed critical value if the two reflectors are each supported in a known manner in the metal components which have a wall thickness which has weakened sections. This may well be associated with the fact that with these circumstances the reflectors can be precisely aligned to one another while the discharge tube is ignited and in a warm operational state.

Further advantages, embodiments and further developments of the invention and particular measures which contribute to an increase of mechanical thermal stability of the arrangement will be apparent from the drawing and the claims of the application.

BRIEF DESCRIPTION OF THE DRAWINGS

The FIGURE is a longitudinal cross-sectional view with portions in elevation for purposes of illustration of a gas laser tube in accordance with the present invention.

DESCRIPTION OF THE PREFERRED EMBODIMENT

The principles of the present invention are particularly useful in a gas laser generally indicated at 20 in the FIGURE which gas laser operates with a helium-neon gas mixture, has an output power of 10 mW and is particularly useful for a laser printer.

The gas laser discharge tube 20 includes a smooth, cylindrical glass casing 1, which at its two ends is sealed in a vacuum-tight fashion by metal end caps 2 and 3 which are applied by fusion. Adjacent the metal cap 2, the glass casing 1 concentrically surrounds a funnel-shaped glass capillary 4, which is fused to the envelope 1 so that the capillary will extend within the casing 1 coaxially. The capillary 4, which could also consist of a ceramic, is permanently fused to the casing 1 adjacent end cap 2 and is supported by at least one spring element 5 to improve the stability thereof. Both metal caps 2 and 3 each have a centrally disposed opening in which a metal component such as reflector holders 6 and 7 are inserted and firmly soldered. Each of these reflector holders or components 6 and 7 supports a reflector body or mirror 8 and 9, respectively, and forms a hermetically sealed connection therewith via glass solder. The walls of each of the components 6 and 7 are weakened in a known manner in one axial zone 14 to enable plastic deformation of the component to enable adjustment of the mirrors 8 and 9 which form an optical resonator. The metal cap 3 is also provided with a metallic exhaust tube in addition to the holder 7.

A cold cathode 11, which consists of a rolled-up aluminum metal sheet, is disposed in the casing 1 adjacent the metal cap 3 and surrounds the free end and a portion of the capillary 4. Due to the resilient nature of the sheet 11, its spring action causes it to be held against the interior of the glass casing 1. The sheet 11 has a dimension greater than the interior circumference of the casing or tube 1 so that the edge portions overlap along a line extending parallel to the axis of the tube 1. To form an electrical connection for the cold cathode 11, the cathode is connected by a feed line 12 to the metal cap 3 and thus no special cathode leads are required to extend through the glass envelope or casing. The reflector holder or component 6 acts as the anode. By utilizing a careful construction and sufficiently high heating temperatures, a baking out of the device can occur and a getter is not necessary.

The overall tube 20 is of a coaxial construction and does not contain any fused contact pins and, therefore, can be produced automatically. The following operation parameters can be selected for example: helium-neon mixture 6:1 to 10:1; filling pressure of 1 to 4 Torr; overall length 600 mm; outer diameter of the casing 40 mm; diameter of the capillary bore approximately 1.9 mm; ignition voltage 8 to 9 KV; anode voltage approximately 2.5 KV; anode current 9 mA, series resistance greater than approximately 60 K Ohm; and output power of approximately 10 mW. Further production and operating details are set forth in U.S. Pat. No. 4,081,762 which includes the disclosure of German Offenlegungsschrift Nos. 25 06 842 and 25 06 707.

If it is desired to protect the gas laser from a non-uniform heat exchange with its environment, for example, a transverse stress cooling on one side, the tube can be accomodated in a closed tube and supported therein by two O-rings. While the illustrated exemplary embodiment was directed to a tube having an output power of approximately 10 mW, higher output powers for example, 25 mW could be achieved with the described laser design.

If the capillary 4 consists of a ceramic, the glass casing 1 can be glazed to the capillary if both materials are thermally adapted and the glass is capable of being glazed. The following combinations are suitable Schott glass 2g54—Koppers ceramic TE Pyrex—Koppers ceramic 10A It has been found that due to high anode capacities the laser output can oscillate. These fluctuations may be eliminated by increasing the inner capillary diameter. However, a larger cross-section of the capillary bore results in a reduced laser output. Therefore in lasers tending to an instable laser action the metal cap adjacent the anode (cap 2 in the drawing) should be replaced by an electrically insulating cap, preferably a glass cap.

Although various minor modifications may be suggested by those versed in the art, it should be understood that I wish to embody within the scope of the patent warranted hereon, all such modifications as reasonably and properly come within the scope of my contribution to the art.

I claim:

1. In a gas laser having a cylindrical discharge tube comprising a glass casing being sealed at its two ends by end caps, each of said end caps supporting a tubular metal component, each of the metal components supporting a reflector of an optical resonator and having a wall with a weakened, axial portion to enable an adjustment of the reflectors of the optical resonator, said casing having a capillary extending coaxially along a portion thereof with said capillary being permanently connected to the glass casing of the discharge tube adjacent one end cap and being supported in the casing by at least one spring element at an axially displaced position, a cold cathode being disposed in the casing adjacent the other of the two end caps and surrounding a portion of the capillary tube, said other end cap being a metal end cap and being connected to said cold cathode, and the metal component of the one cap being the anode, the improvement comprising the glass casing having a length of at least 40 cm and an outer diameter of at least 35 mm, said one end cap supporting said anode consisting of an insulating material, said capillary consisting of a ceramic and being glazed to said glass casing, and said casing containing a helium neon mixture so that the gas laser is a helium neon gas laser with an output power of at least 10 mW.

* * * * *